US008205626B2

(12) United States Patent
Myers

(10) Patent No.: US 8,205,626 B2
(45) Date of Patent: Jun. 26, 2012

(54) TREE STAND COVER

(76) Inventor: Donald J. Myers, Albertville, AL (US)

( * ) Notice: Subject to any disclaimer, the term of this patent is extended or adjusted under 35 U.S.C. 154(b) by 1172 days.

(21) Appl. No.: 11/779,472

(22) Filed: Jul. 18, 2007

(65) Prior Publication Data

US 2008/0111404 A1 May 15, 2008

Related U.S. Application Data

(60) Provisional application No. 60/865,046, filed on Nov. 9, 2006.

(51) Int. Cl.
*E04H 15/04* (2006.01)
*A47C 7/62* (2006.01)

(52) U.S. Cl. .......... 135/90; 135/901; 150/154; 182/187; 297/184.11

(58) Field of Classification Search ................... 150/154, 150/158; 206/315.11; 297/184.1, 184.11; 135/90, 901; 182/187
See application file for complete search history.

(56) References Cited

U.S. PATENT DOCUMENTS

| 1,736,383 | A | * | 11/1929 | Waggoner | 150/154 |
|---|---|---|---|---|---|
| 2,057,551 | A | * | 10/1936 | Bishop | 297/227 |
| 3,368,725 | A | | 2/1968 | Martin | |
| 4,274,508 | A | | 6/1981 | Hughes et al. | |
| 4,505,286 | A | * | 3/1985 | Madion | 135/90 |
| 4,693,511 | A | * | 9/1987 | Seltzer et al. | 297/228.1 |
| 5,165,500 | A | | 11/1992 | Bass | |
| 5,482,137 | A | * | 1/1996 | McNeill | 182/187 |
| 5,617,932 | A | | 4/1997 | Stuart | |
| 5,944,213 | A | * | 8/1999 | Alicea et al. | 220/287 |
| 6,202,665 | B1 | | 3/2001 | O'Hare | |
| 6,394,720 | B1 | * | 5/2002 | McCay | 410/100 |
| 6,510,922 | B1 | | 1/2003 | Hodnett | |
| 6,575,626 | B1 | | 6/2003 | Gillespie, Jr. et al. | |
| 6,887,002 | B1 | * | 5/2005 | Chen | 400/490 |
| 6,986,404 | B1 | * | 1/2006 | Laborde | 182/135 |
| 7,051,908 | B2 | | 5/2006 | Mignano | |
| 7,309,102 | B1 | * | 12/2007 | Davis | 297/188.06 |
| 2002/0152665 | A1 | * | 10/2002 | Varnado | 43/1 |
| 2002/0158093 | A1 | | 10/2002 | Westimayer | |
| 2003/0024559 | A1 | * | 2/2003 | Fields | 135/90 |
| 2003/0168285 | A1 | * | 9/2003 | Eastman, II | 182/187 |
| 2004/0211625 | A1 | | 10/2004 | George | |
| 2004/0251082 | A1 | | 12/2004 | Corbitt | |

* cited by examiner

*Primary Examiner* — Sue Weaver
(74) *Attorney, Agent, or Firm* — Glen L. Gross; Shlesinger Arkwright & Garvey LLP

(57) ABSTRACT

The present device protects a tree stand attached to a tree comprising a fabric member having a first and mating edges. The first edge includes a channel and the mating edge is divided into three sections. The first and third sections are parallel to the tree and the second section is disposed between the first and third sections. Further, the second section includes a channel. The fabric member is configured to cover a portion of the tree stand with the mating edge against the tree. The device includes two securing members each having connectable ends. A portion of the first securing member is disposed within the first channel and a portion of the second securing member is disposed with the second channel. Additionally, the device includes a connecting member having a first end that engages the first securing member and a second end that engages the second securing member.

18 Claims, 7 Drawing Sheets

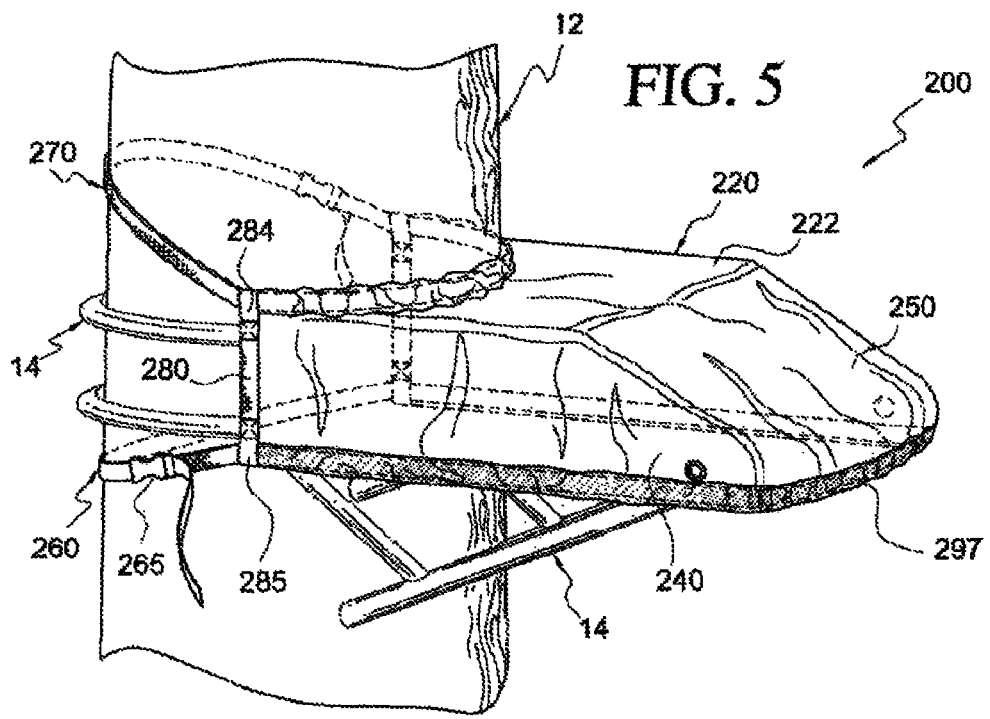
FIG. 5
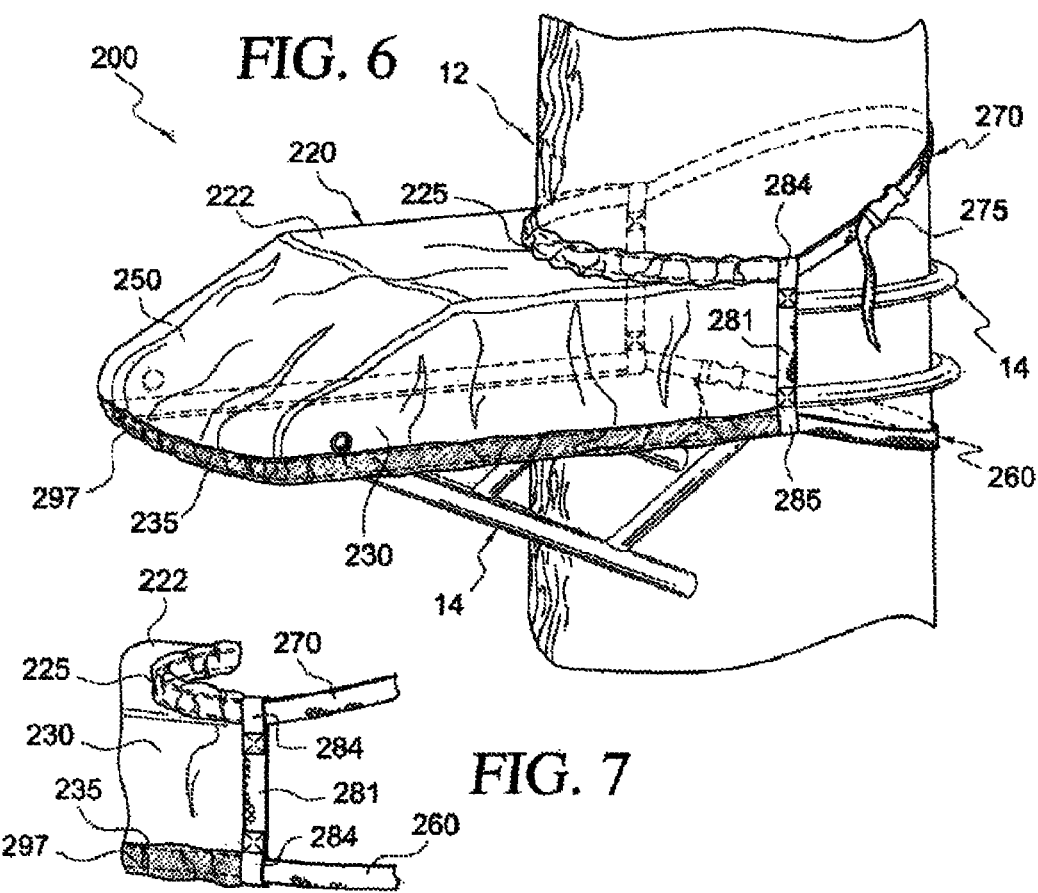
FIG. 6
FIG. 7

TREE STAND COVER

CROSS REFERENCE TO RELATED APPLICATION

This nonprovisional application claims the benefit of Provisional Application No. 60/865,046, filed on Nov. 9, 2006, which is incorporated herein by reference in its entirety and to which priority is claimed.

BACKGROUND OF THE INVENTION

1. Field of Invention

The present invention relates to protective covers for hunting tree stands and the like.

2. Description of Related Art

Many hunters hunt by using a tree stand. Also, many hunters leave their tree stand on a tree when not in use so the hunter does not have to put the tree stand up and take the tree stand down for each hunting trip. A hunting tree stand left in the woods is subjected to the elements of the outdoors. Conventional tree stand covers have been built to protect tree stands from rain, frost and snow. However, most conventional hunting tree stand covers are designed to fit a tree stand for which they are designed. If a hunter buys a new tree stand, the hunter must also buy a new tree stand cover for that particular stand. In other words, most conventional hunting tree stand covers do not provide a universal fit.

Some conventional tree stand covers have been made that claim to fit various types of tree stands, but these conventional universal type covers fail to adequately protect the tree stand because conventional tree stand covers do not maintain a seal with a tree.

Another problem with conventional tree stand covers is that they fail to provide a way for the hunter to tighten the upper surface of the conventional universal tree stand cover so as to keep the upper surface for collecting rain or snow as the weight builds or from ripping the material.

Still another defect with conventional tree stand covers, is that conventional tree stand covers are not breathable and therefore allow moisture to collect on the inside of the cover and consequently on the tree stand seat.

SUMMARY OF INVENTION

The present invention is a tree stand cover designed to protect a tree stand in all the outdoor elements and provide the hunter a universal fit for whatever style of tree stand the hunter owns. It is an object of the present invention to overcome the drawbacks and shortcomings of conventional tree stand covers.

Particularly, the present invention provides a tree stand cover that ensures a tight seal against the tree keeping out rain and snow. While keeping out the rain and snow, the present invention uses a breathable material to prevent condensation build up on the tree stand while the tree stand is covered. This not only provides for a dry seat for the hunter, but also reduces corrosion front moisture.

Additionally, the present invention will allow a user to tighten a tree stand cover against a tree without ripping the sides of the tree stand cover.

The present invention further provides vertical connection straps to allow the hunter to tighten the present invention without ripping the material.

The present invention is a device bar protecting a tree stand that is attached to a tree. The device comprises a pliable fabric member having a first edge and a mating edge. The first edge includes a length and a first channel along its length. The mating edge also has a length and is divided into three sections. The first and third sections are operably configured to be substantially parallel to the tree and the second section is disposed between the first and third sections and is substantially perpendicular to the first and third sections. Further, the second section includes a second channel. The fabric member is operably configured to cover a portion of the tree stand and the mating edge is adjacent to the tree when in use. Additionally, the device includes first and second securing members each having a length and connectable ends. A portion of the first securing member is disposed within the first channel and a portion of the second securing member is disposed within the second channel. The connectable ends are operably configured to wrap around the tree and connect together when the device is in use. Further, the device includes a connecting member, wherein the connecting member has a first end that engages the first securing member and a second end that engages the second securing member external to the first and second channels.

The present invention further includes a hunting tree stand protection having a cover formed by a front, top and two opposing sides, and having a bottom edge, a tree mating edge, a first channel disposed along the bottom edge and a second channel disposed along the tree mating edge. The cover is operably configured to cover a portion of the hunting tree stand when the device is in use. This embodiment of a device made in accordance with the present invention further includes a first strap having a length and releasable ends, wherein the length is adjustable and a portion of the length is disposed within the first channel; a second strap having a length and releasable ends, wherein the length is adjustable and shorter than the length of the first strap and a portion of the length is disposed within the second channel. The device additionally includes a first vertical member being adjustable in length and having an end attached to the first strap and a second end attached to the second strap and disposed external to the first side of the cover. The device also includes a second vertical member being adjustable in length and having an end attached to the first strap and a second end attached to the second strap and disposed external to the second side of the cover.

In yet another embodiment made in accordance with the present invention, a device is presented that provides a cover for a hunting tree stand comprising a waterproof fabric member operably configured to cover a portion the hunting tree stand when in use and having a first edge having a length and a first channel throughout the length of the first edge. The first edge is generally oriented parallel to the ground, and a second edge having a first, second and third portions. The first and third portions are generally oriented parallel to a tree, and the second portion is concave and includes a second channel and is perpendicular to and disposed between the first and third portions. The fabric member further includes a plurality of eyelets along the first edge. The device additionally includes a first securing member having an adjustable length with two connectable ends. A portion of the first securing member is disposed within the first channel, and the connectable ends are disposed outside the first channel. The two connectable ends are operably configured to wrap around the tree and connect together when the device is in use. Further, the device includes a second securing member having an adjustable length with two connectable ends. A portion of the second securing member being disposed within the second channel, wherein each connectable end is outside the second channel and the two connectable ends are operably configured to wrap around the tree and connect together when the device is in use.

A first and second tension member are also included in the device, wherein the first tension member is attached to the first and second securing members in proximity to the first portion of the second edge and the second concocting member is attached to the first and second securing members in proximity to the third portion of the second edge. A third securing member is affixed to one of the plurality of eyelets such that when the device is in use, the third securing member is drawn beneath the hunting tree stand and attached to a second of the plurality of eyelets.

BRIEF DESCRIPTION OF FIGURES

Various exemplary embodiments of this invention will be described in detail, with reference to the following figures, wherein:

FIG. 5 is a let perspective view of an alternative embodiment of a device made according to the present invention;

FIG. 6 is right perspective view of the device of FIG. 5;

FIG. 7 is a detail view of a vertical strap used on the device of FIG. 5;

DETAILED DESCRIPTION OF INVENTION

Figure 1:
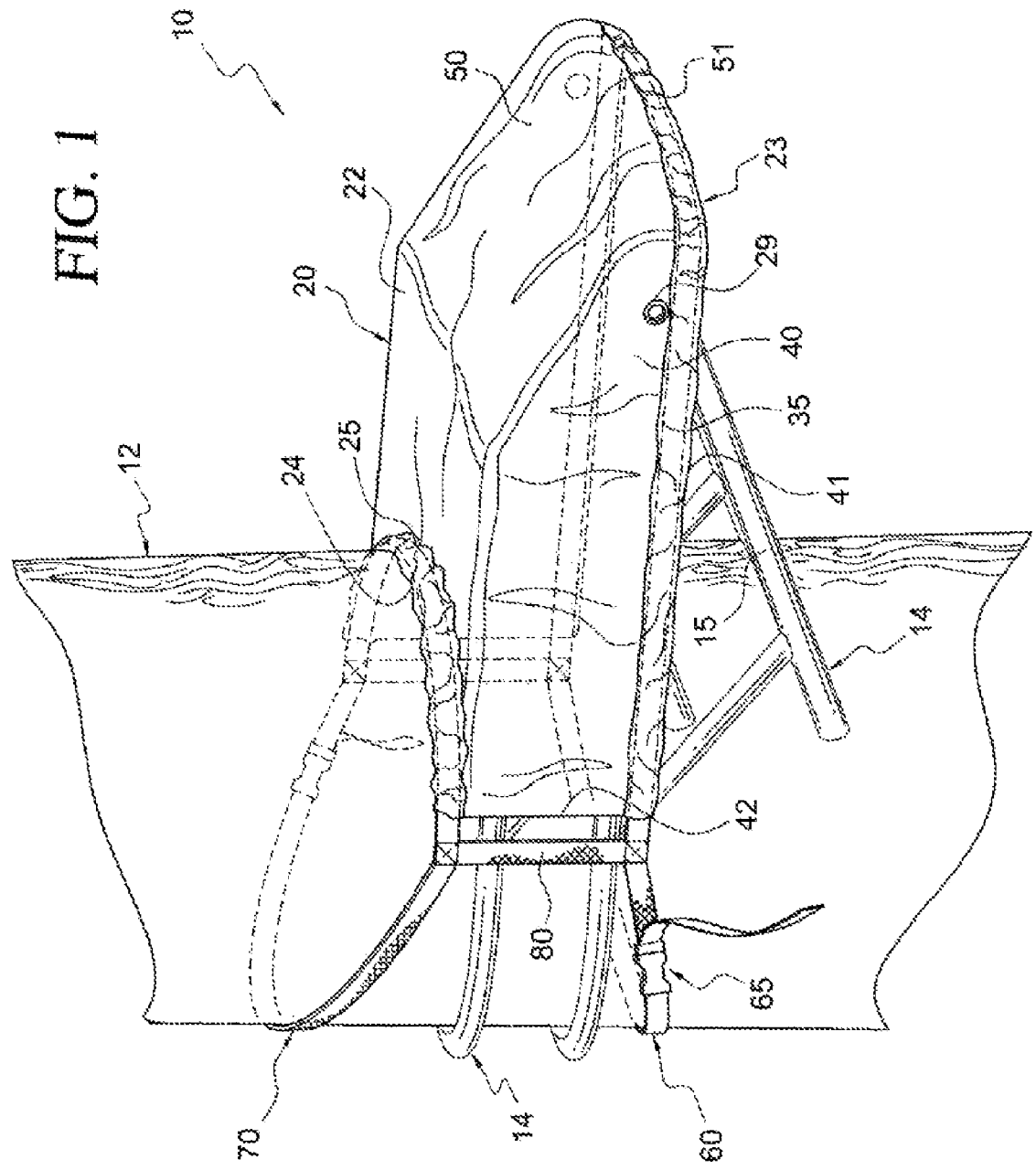
FIG. 1 is a left perspective view of a tree stand cover made according to this invention.
Figure 2:
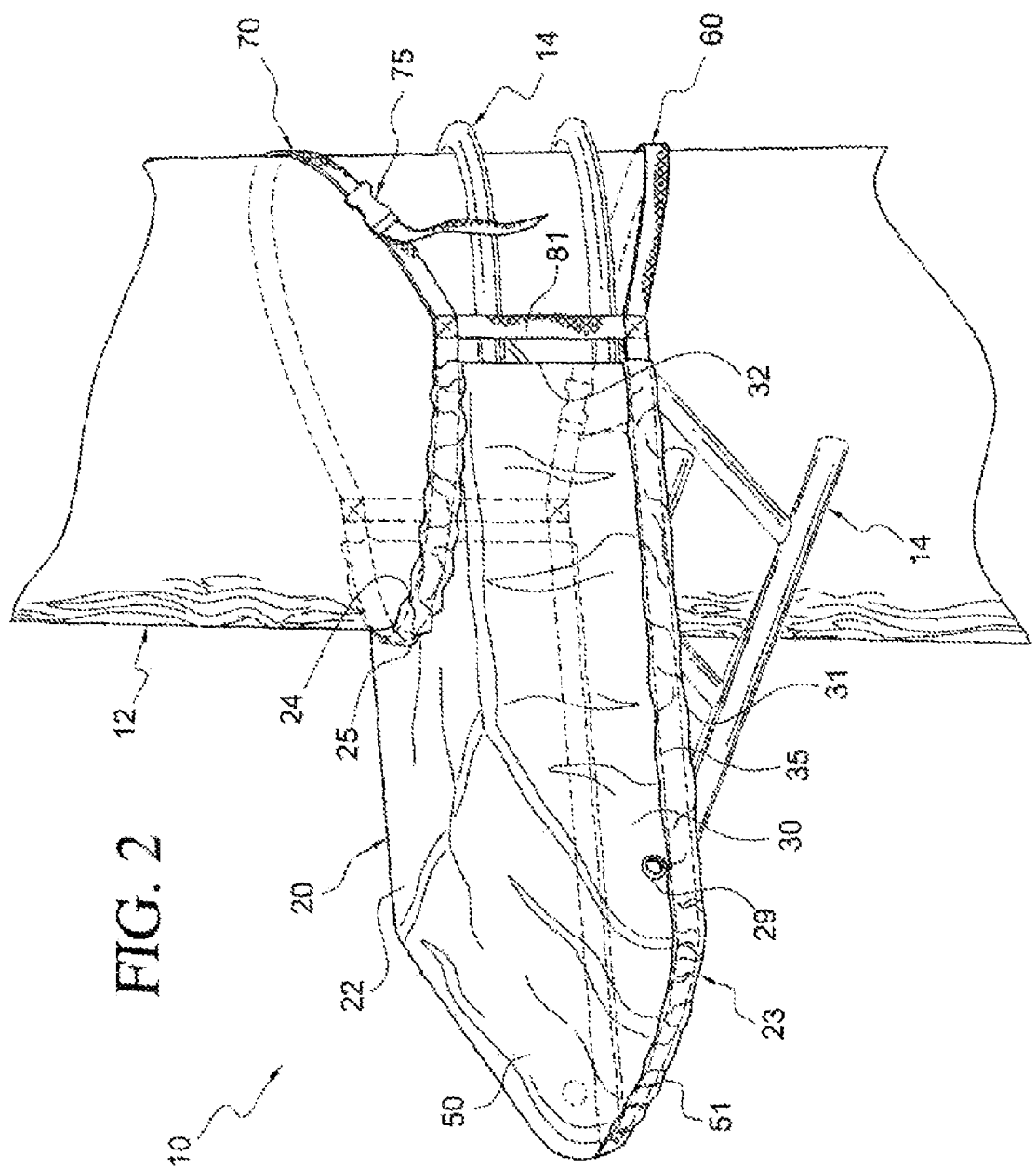
FIG. 2 is a right perspective view of the tree stand cover device of FIG. 1.
Figure 3:
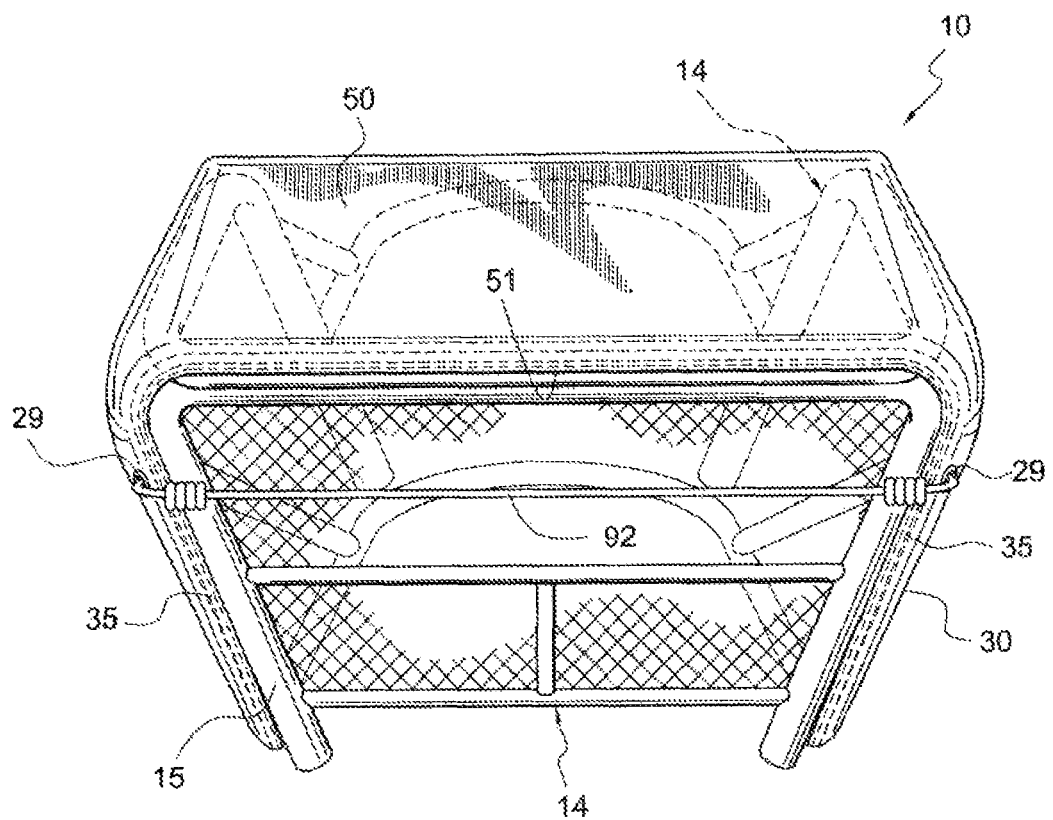
FIG. 3 is a lower front partial perspective view of the tree stand cover device of FIG. 1.

The present invention, as shown in FIGS. 1, 2 and 3 is a tree stand cover. The tree stand cover device 10 is designed to protect an existing tree stand 14 having a frame 15 designed for mounting on a tree 12. The device 10 is also designed to protect a fixed ladder type hunting stand (not shown). Instead of a hunter taking down the tree stand 14 after every hunting trig, the hunter can protect the tree stand 14 by covering the tree stand 14 with the device 10.

FIGS. 1 through 3 show the tree stand cover device 10. The device 10 protects the tree stand 14 from the outdoor elements, rain, frost and snow. Further, the device 10 is designed to fit must conventional tree stand sizes.

The tree stand cover 10 includes a first member 20, a second member or first securing strap 60, a third member or second securing strap 70 and at least one connecting strap 80. The first member or cover 20 is preferably a flexible and pliable flat sheet material. It is also preferred that the cover 20 be made from a material that is water proof and breathable. In the present embodiment, the cover 20 is constructed out of three layers of non-woven polypropylene with a layer of microporous film; however, it should be appreciated that in other various exemplary embodiments, other water proof materials common in the art may be used. The breathability of the cover 20 eliminates the problem of condensation building up on the tree stand 14 while the tree stand 14 is covered.

Referring to FIGS. 1 and 2, the cover 20 has a horizontal or top portion 22, a first or side portion 30 and a second or side portion 40. Each of the portions 30 and 40 has exterior and interior surfaces. Additionally, the cover 20 has from portion 50 and a first edge 23. The cover 20 in the present embodiment is constructed out of a single sheet of material. The listing of the portions 30, 40 and 50 are for providing orientation of the device 10 relative to the tree 12. It should be appreciated, however, that in other various exemplary embodiments, the cover could be constructed of individual portions connected together by means common in the art, such as for example, sewn or heat sewn together.

The first or bottom edge 23 of the cover 20 has enclosed a first channel 35. The first channel 35 is operably configured to receive a strap. The first, second and front portions 30, 40 and 50 of the covet 20 each have a first edge 31, 41 and 51 respectively. The first edges 31, 41 and 51 combined forms the bottom edge 23.

The top portion 22 has a rear or mating edge 24. Along the rear edge 24, is an enclosed second channel 25. The rear edge 24 is concaved to allow for the curvature of the tree 12. The channel 25 is at least along a portion of the rear edge 24. The second channel 25 is operably configured to receive a strap.

The cover 20 further includes a plurality of eyelets 29 disposed along the bottom edge 23. In the present embodiment, the cover 20 has one eyelet 29 disposed along the first edge 31 and a second eyelet 29 disposed along the second edge 41. The eyelets 29 are disposed generally near the junction of the first portion 30 and the front portion 50, and the junction of the second portion 40 and the front portion 50.

The second member or first strap 60 and the third member or second strap 70 are used for securing the device 10 to the tree 12 and the stand 14. In the present embodiment, the first and second straps 60 and 70 are a length of flat nylon web strap material. It should be appreciated that in other various exemplary embodiments, the first and second members could be of other materials common in the art of making straps.

The first strap 60 and second strap 70 each include an adjustable length. A user may adjust the length of the first strap 60 and or second strap 70, so that when in use, the straps 60 and 70 will fit around the tree 12. Both the first and second straps 60 and 70 further include quick disconnects 65 and 75 respectively at a tensions of the straps 60 and 70. The quick disconnects 65 and 75 permit the user to quickly attach the device 10 to the tree 12, when the device 10 is in use. The quick disconnects 65 and 75 in the present embodiment are a double prong quick release design. However, it should be appreciated that in other various exemplary embodiments, other quick disconnects common in the art may be used, such as for example, hook and loop fasteners.

Figure 4:
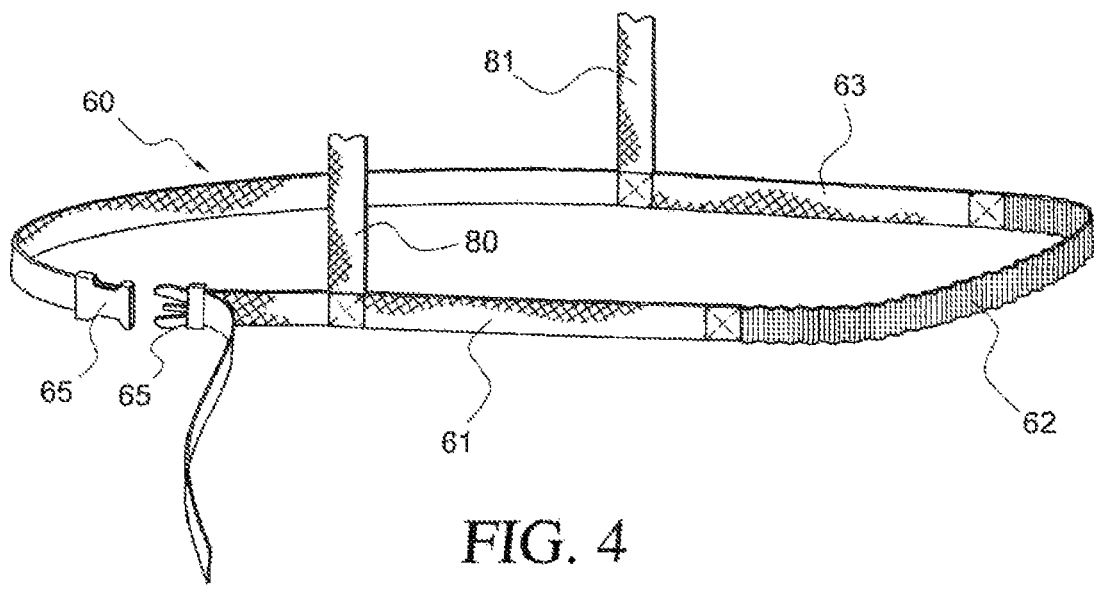
FIG. 4 is a perspective view a second strap used in the tree stand cover device of FIG. 1.

The first strap 60 in the present embodiment includes a first, second and third segments, 61, 62, and 63, as shown in FIG. 4. The first segment 61 and the third segment 63 are removably connectable to each other by the use of the quick disconnect 65. The second segment 62 is an elastic portion. The second segment 62 is attached to one end of the first segment 61 and one end of the third segment 63. In the present embodiment, the first, second and third segments are stitched to each other. However, it should be appreciated that in other various exemplary embodiments, the first, second and third segments, may be attached to each other by other means common in the art.

A portion of the first strap 60 is disposed partial within the channel 35 along the bottom edge 23 of the cover 20. It is preferred that the first strap 60 be disposed within the enclosed channel 35, such that the second segment 62 is positioned in the channel 35.

While the first strap 60 of the present embodiment has three sections, it should be appreciated that in other various exemplary embodiments, the second strap could be one continuous unitary piece of the same material.

The second strap 70 is disposed along the rear edge 24 of the cover 20. In the present embodiment a portion of the second strap 70 is disposed within the enclosed channel 25 of the cover 20.

Both the first and second straps 60 and 70, have an adjustable length. The lengths are adjustable by the use of a quick-pull one-way adjustment. A user will attach both the first and second straps 60 and 70 around the tree 12. The device 10 is tightened against the tree 12 by the user pulling on the first and second straps 60 and 70. The rear edge 24 of the top portion 22, the first portion 30 and the second portion 40 are pulled up fight against the tree 12, while the front edge 51 of the front portion 50 is pulled tight against the tree stand 14.

The quick disconnect 75 of the second strap 70 is preferably positioned on the right side of the device 10, as shown in FIG. 2. In the present embodiment, the quick disconnect 75 is generally disposed along the second strap about twelve inches from the first portion 30. The quick disconnect 65 of the first strap 60 is preferably positioned on the left side of the device 10 as shown in FIG. 1. In the present embodiment, the quick disconnect 65 is generally disposed along the first strap 60 about twelve inches from the second portion 40. This staggering of the quick disconnects 75 and 65 helps keep tension on the device 10 ensuring that the device 10 stays snug against the tree 12.

Additionally, in the present embodiment, the first strap 60 and the second strap 70 include generally about sixty inches of adjustment capability. It should be appreciated that in other various exemplary embodiments, the adjustment capability may be increased or decreased.

When in use, the device 10 is placed on the tree stand 14. The front portion 50 is placed on the part of the bee stand 14 that is farthest from the tree 12. The rear edge 24 of the cover 20 is placed against the tree 12. The first strap 60 is placed around the tree 12 and connected together. The second strap 70 is placed around the tree 12 and connected together. The user adjusts the first and second straps 60 and 70. As the first strap 60 is tightened, the second strap 60 pulls the bottom edge 23 of the cover 20 under the frame 15 of the tree stand 14, as shown in FIG. 3. The first edges 31, 41 and 51 of the bottom edge 23 are pulled tight under the frame 15, thus engaging the device 10 around the tree stand 14.

The device 10 further includes at least one connecting member 80. In the present embodiment, the device 10 has a first connecting member 80 and a second connecting member 81. The first connecting member 80 is attached to the first strap 60 and the second strap 70 in proximity to the second portion 40 of the cover 20. The second connecting member 81 is attached to the first strap 60 and the second strap 70 in proximity to the first portion 30 of the cover 20. In the present embodiment the first sod second connecting members 80 and 81 each have a length of generally about twelve inches. It should be appreciated, however, that in other various exemplary embodiments, the length of the first and second connecting members may have other lengths as required by the size of the cover.

As shown in FIG. 1, the first connecting member 80 is disposed adjacent to and generally parallel to a rear edge 42 of the second ponies 40. In the present embodiment the first connecting member 80 is fixedly attached to the first strap 60 and the second strap 70 adjacent to the rear edge 42 of the second portion 40. It is preferred that the connecting member 80 be attached to the first and second straps 60 and 70, generally at a small distance from the rear edge 42 of second portion 40. The preferred distance away from the rear edge 42 is about two inches.

The second connecting member 81 is identical to the first connecting member 80 except that the second vertical strap 81 is disposed adjacent to and generally parallel to a rear edge 32 of the first portion 30. It is preferred, that the connecting member 81 be attached to the first and second straps 60 and 70, generally at a small distance from the rear edge 32 of first portion 30. The preferred distance away from the rear edge 32 is about two inches.

While in the present embodiment, the first and second connecting members 80 and 81 are fixedly attached to the first and second straps 60 and 70, it should be appreciated that in other various exemplary embodiments, the first and second connecting members could attach to the first and second straps in other ways. For example, the first and second connecting member could be fixedly attached to the first strap and slideably attached to the second strap or, the first and second connecting members could be slideably attached to both the first and second straps. Examples of alternative embodiments will be discussed below.

The first connecting members 80 and 81 prevent the cover 20 from tearing along the rear edges 32 and 42. As the user pulls on the first and second straps 60 and 70 to tighten the device 10 around the tree 12 and the tree stand 14, the second strap 70 is pulled at an angle relative to the first strap 60. This angle would place tension on the cover 20 at the rear edges 32 and 42 without the connecting straps 80 and 81. The correcting straps 80 and 81 keep the securing scraps 60 and 70 relatively parallel to each other near the rear edges 32 and 42 thus preventing arty tension on the tear edges 33 and 42. Further the connecting straps 80 and 81 help preventing any tearing of the material at the rear edges 32 and 42, when the user tightens the first and second straps 60 and 70. It is preferred that the first and second connecting members 80 and 81, in the present embodiment, be stitched to the first and second straps 60 and 70. It should be appreciated, that in other various exemplary embodiments, the vertical straps can be attached to the first and second straps by other methods common in the art.

If the tree stand 14 is smaller in size, the user may use optional strap 92, as shown in FIG. 3. The optional strap 92 removably connects to the plurality of eyelets 29. In the present embodiment, the optional strap 92 is an elastic cord. It is preferred that strap 92 be a bungee cord. The optional strap 92 helps keep the edge 23 of the cover 20 tight against the frame 15 of the tree stand 14. However, it should be appreciated, that in other various exemplary embodiments, other types of straps common in the art may be used such as, but not limited to, parachute cord, fixed straps and the like.

Figure 11:
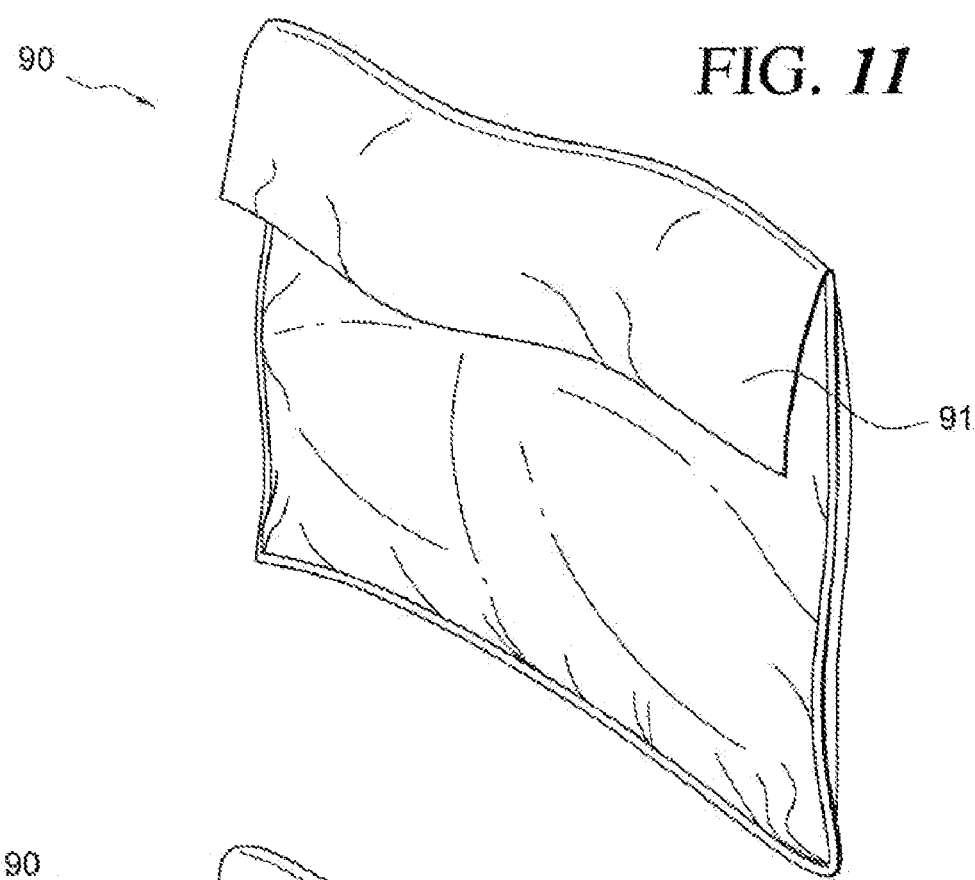
FIG. 11 is a front perspective view of a case made according to the present invention for the device of FIG. 1; and, FIG. 12 is it rear perspective view of the case of FIG. 11.
Figure 12:
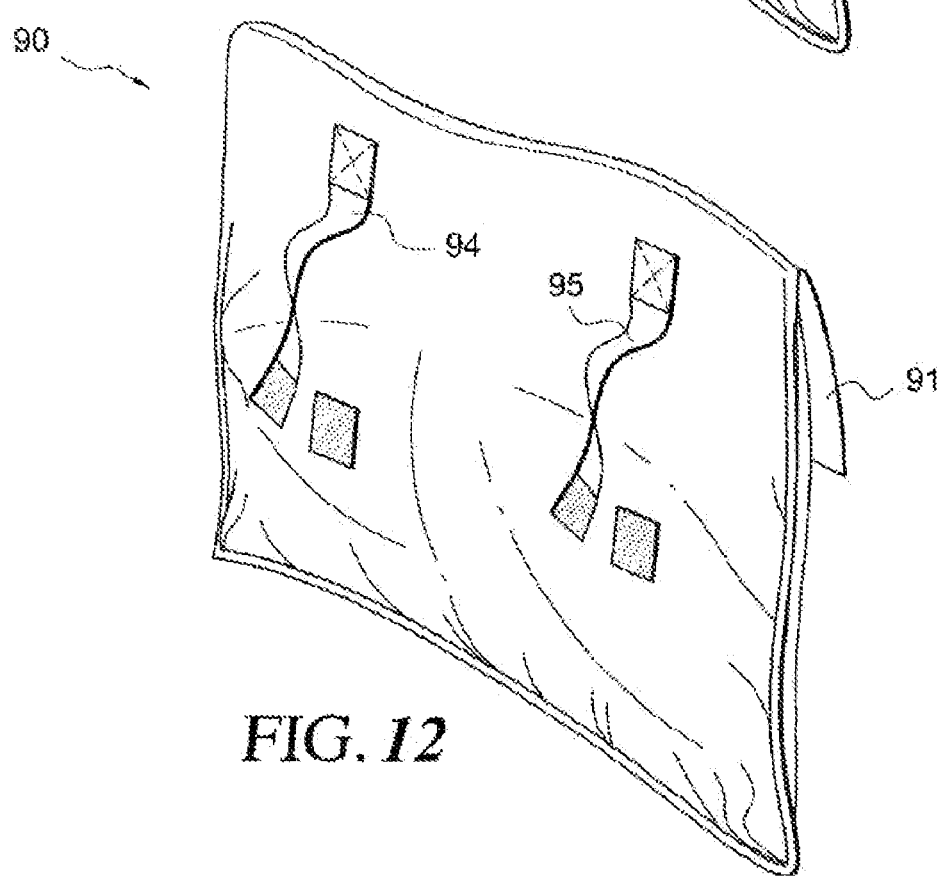

The device 10 further includes a case 90 as shown in FIGS. 11 and 12. The case 90 is operably configured to receive the device 10 after the device 10 has been folded and placed inside the ease 90. The case 90 is a generally rectangular shape pouch having an opening and an interior operably configured to receive the device 10, when the device 10 is folded. The case 90 includes a closing flap 91. The closing flap 91 covers an opening of the case 90. In the present embodiment, the closing flap 91 is held in a closed position by the use of hook and loop fasteners. It should be appreciated that in other various exemplary embodiments, the closing flap may be held closed by other methods common in the art, such as for example, zippers and snaps.

The case 90 is constructed out of the same material as the cover 20. The case 90 further includes a plurality of hanging flaps 94 and 95. The hanging flaps 94 and 95 are disposed on an exterior of the case 90. The hanging flaps 94 and 95 each have two ends. The first end is fixedly attached to the exterior of the case 90. The second end is removably attached to the exterior of the case 90. The user removes the second end, wraps the second end around a piece of structure of the tree stand 14 and then reattaches the second end to the case 90. In the present embodiment, the second end attaches to the case by the use of hook and loop fasteners. It should be appreciated that in other various embodiments, the second end may be attached to the case by other methods common in the art such as, but not limited to, snaps.

Referring now to FIGS. 5 through 7, a tree stand cover device 200 is shown. The device 200 is an alternative exemplary embodiment of a tree stand cover, made in accordance with the present invention. The tree stand cover device 200 is similar to the tree stand cover device 10 as described above. The device 200 has a cover 220. The cover 220 has a top portion 222, a first portion 230, and a second portion 240. The device 200 also includes a second member or first strap 260 and a third member or second strap 270, similar to the device 10.

Further, as in the device 10, the device 200 also includes enclosed channels 225 and 235. The enclosed channel 225 is operably configured to receive the second strap 270. The enclosed channel 235 is operably configured to receive the first strap 260. Still further, another similarity with the device 10 is that the device 200 includes first and second connecting members 280 and 281.

The device 200 is different from the device 10 in that the first and second connecting members 280 and 281 are integral to the second and first portions 240 and 230. Another difference is that the first and second connecting members 280 and 281 further include a first or upper bop member 284 and a second or lower loop member 285 as shown in FIGS. 5 through 7.

The first connecting member 280 is integral to the second side portion 240 and the second connecting member 281 is integral to the first side portion 230. The connecting members 280 and 281 are sewn onto the fabric of the cover 220. The second strap 270 passes through the first loop member 284 of each the connecting members 280 and 281. The first strap 260 passes through the lower loop member 285 of each the connecting members 280 and 281.

The device 200 provides the benefit of reinforcing the edges of the first and second portion 230 and 240 of the cover 220, such that as the user tightens the first and second straps 260 and 270, the cover 220 will not rip. Additionally, the inclusion of the looped ends 284 and 285 on the first and second connecting member 280 and 281 allows for easier adjustment of the first and second straps 260 and 270 as the user tightens them against the tree 12.

Figure 8:
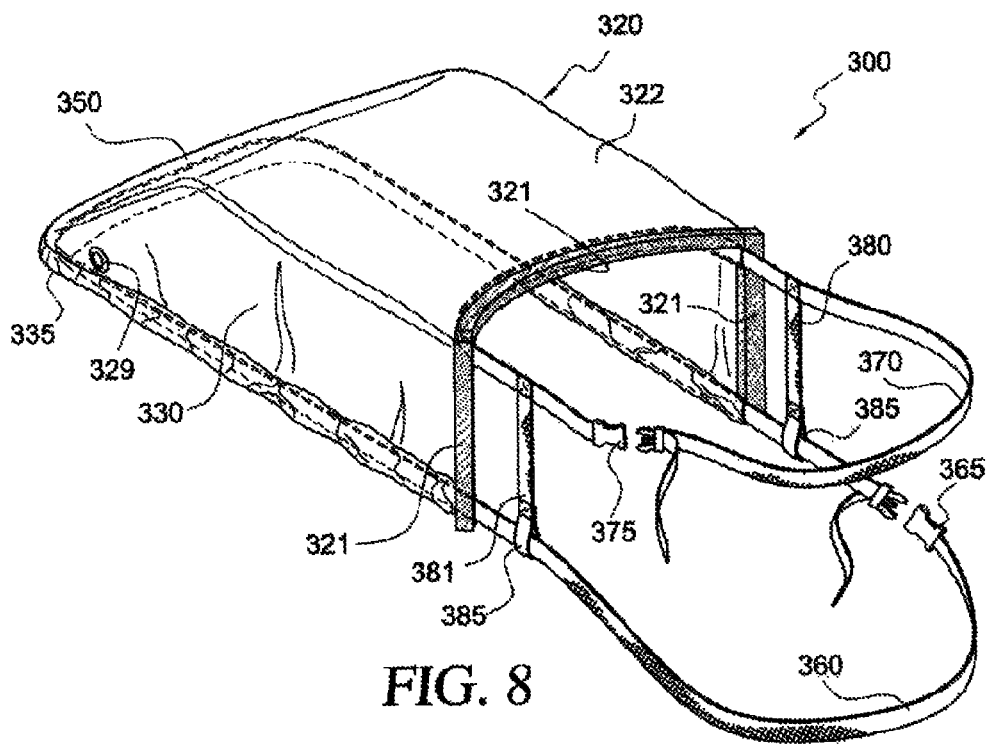
FIG. 8 is a right rear perspective view of another alternative embodiment of a device made according to the present invention.

Referring now to FIG. 8, a tree stand cover device 300 made in accordance with the present invention is shown. The device 300 is an alternative exemplary embodiment of the device 10, made in accordance with the present invention. The tree stand cover device 300 is similar to the tree stand cover device 10 as described above. The device 300 has a cover 320. The cover 320 has a top portion 322, a first portion 330, and a second portion 340. The device 300 also includes a second member or first strap 360 and a third member or second strap 370, similar to the device 10.

Further, as in the device 10, the device 300 includes enclosed channels 325 and 335. The enclosed channel 325 is operably configured to receive the second strap 370. The enclosed channel 335 is operably configured to receive the first strap 360. Still further, another similarity with the device 10 is that the device 300 includes first and second connecting members 380 and 381.

The device 300 is different from the device 10 in that the device 300 further includes a compressible mating surface 321. The compressible mating surface 321 is disposed on the cover 320 along the top portion 322 and the first and second portion 330 and 340 such that the compressible mating surface 321 is in contact with the surface of the tree 12, when in use. The compressible mating surface 321 conforms to the tree 12 surface when the first and second straps 360 and 370 have tension applied by the user. The mating surface 321 acts as a gasket between the cover 320 and the tree 12.

Still further, the device 300 is different from device 10 in that first and second connecting members 380 and 381 include a loop ends 385, which is similar to the loop ends 285 in the device 200. The inclusion of the looped ends 385 on the first and second connecting member 380 and 381 allows for easier adjustment of the second strap 370 as the user tightens them against the tree 12.

In the present embodiment, the compressible mating surface 321 is one integral piece of waterproof foam. However, it should be appreciated that in other various exemplary embodiments, the compressible mating surface could be other compressible materials common in the art.

Figure 9:
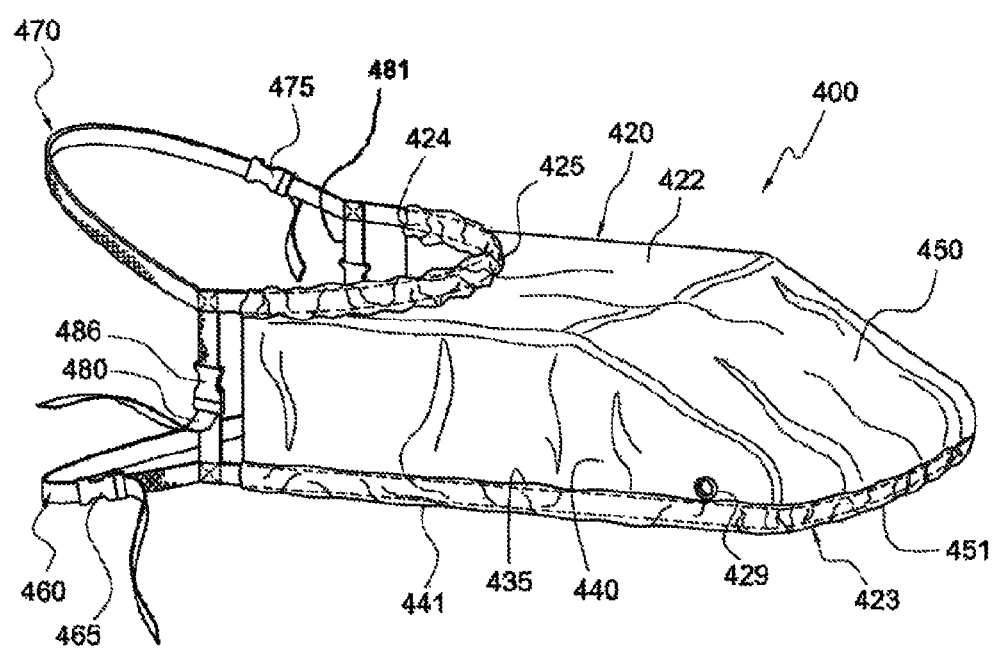
FIG. 9 is a left perspective view of the device in FIG. 8.

Referring now to FIG. 9, a tree stand cover device 400 made in accordance with the present invention is shown. The device 400 is an alternative exemplary embodiment of the device 10, made in accordance with the present invention. The tree stand cover device 400 is similar to the tree stand cover device 10 as described above. The device 400 has a cover 420. The cover 420 has a top portion 422, a first portion 430, and a second portion 440. The device 400 also includes a second member or first strap 460 and a third member or second strap 470, similar to the device 10.

Further, as in the device 10, the device 400 includes enclosed channels 425 and 435. The enclosed channel 425 is operably configured to receive the second strap 470. The enclosed channel 435 is operably configured to receive the first strap 460. Still further, another similarity with the device 10 is that the device 400 includes first and second connecting members 480 and 481.

The device 400 is different from the device 10 in that the first and second connecting members 480 and 481 are adjustable in length. In the present embodiment, the connecting members 480 and 481 each include a chinch portion or tension member 486, with which the user can lengthen or shorten the length of the connecting members 480 and 481. However, it should be appreciated that in other various exemplary embodiments, the connecting members may have other method of adjusting the length that are common in the art.

The device 400 provides the benefit of providing vertical adjustment to the connecting members 480 and 481, so that when in use, and the user can applies tension to the first and second straps 470 and 460, the connecting members 480 and 481 can be adjusted to keep the cover 420 against the tree.

Figure 10:
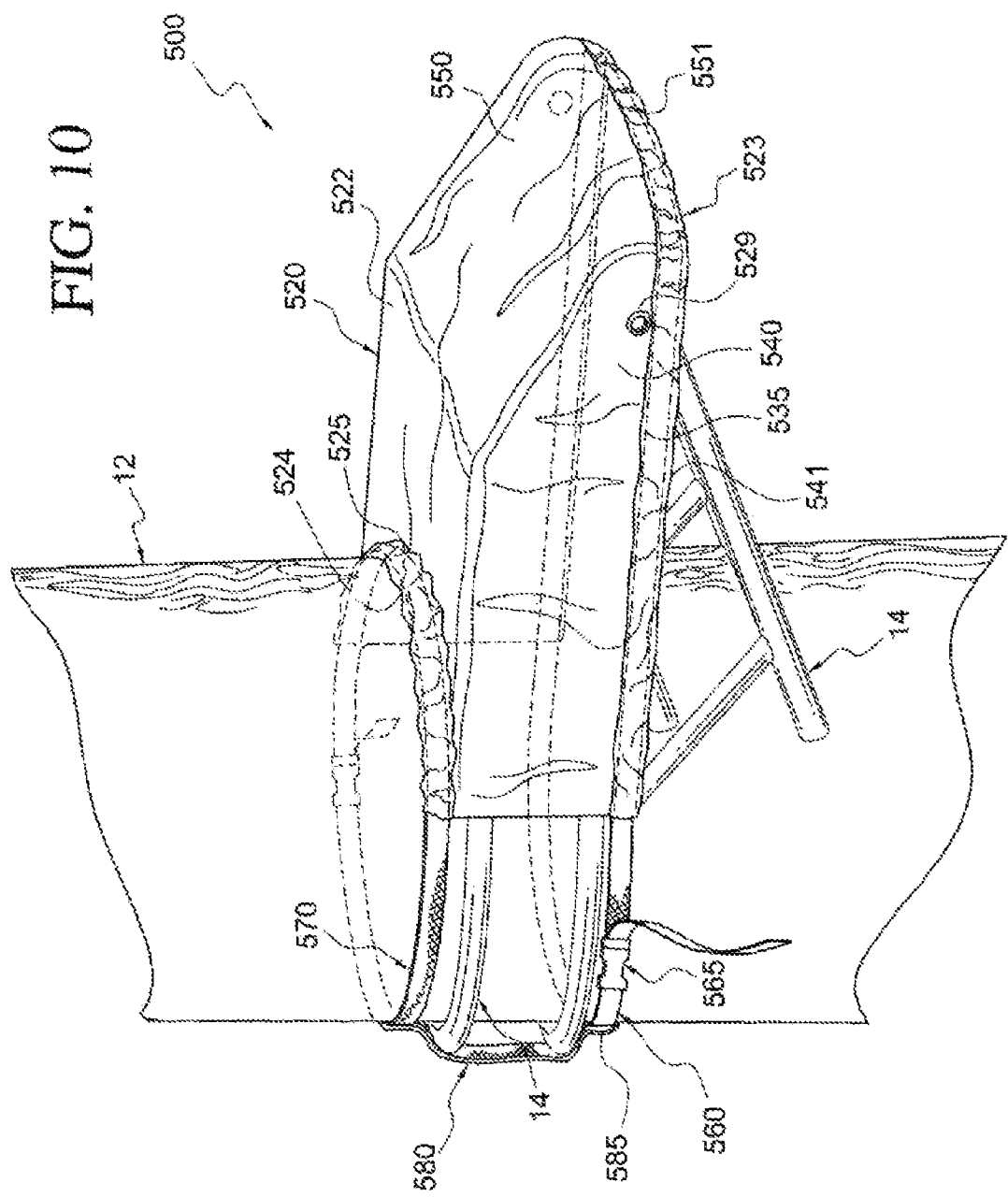
FIG. 10 is a perspective view of still another alternative embodiment of a device made according to the present invention.

Referring now to FIG. 10, a tree stand cover device 500 made in accordance with the present invention is shown. The device 500 is an alternative exemplary embodiment of the device 10, made in accordance with the present invention. The tree stand cover device 500 is similar to the tree stand cover device 10 as described above. The device 500 has a cover 520. The cover 520 has a top portion 522, a first portion 530, and a second portion 540. The device 500 also includes a second member or first strap 560 sod a third member or second strap 570, similar to the device 10.

Further, as in the device 10, the device 500 includes enclosed channels 525 and 535. The enclosed channel 525 is operably configured to receive the second strap 570. The enclosed channel 535 is operably configured to receive the first strap 500.

The device 500 is different from the device 10 in that the device 500 has only one connecting member 580. The connecting member 580 is disposed on a side of the tree 12 that is substantially opposite the side of the tree 12 where the tree stand 14 is mounted, when the device 500 is in use. In the present embodiment, the connecting member 580 is fixedly attached to the second securing strap 570. It should be appreciated that in other various exemplary embodiments, the connecting strap could be slideably attached to the second securing strap.

The connecting member 580 includes a looped end 585, though which the first strap 560 passes when the device 500 is in use. Additionally, it should be appreciated that the while the connecting strap 580 in the present embodiment is of fixed length, in other various exemplary embodiments, the connecting strap could include an adjustable length.

Referring now to FIGS. 11 and 12, the device 10 further includes a case 90. The case 90 is operably configured to receive the device 10, when the device 10 is not in use, after the device 10 has been folded and placed inside the case 90. The case 90 is a generally rectangular shape pouch having an opening and an Interior operably configured to receive the device 10. The case 90 includes a closing flap 91. The closing flap 91 covers an opening of the case 90. In the present embodiment, the closing flap 91 is held in a closed position by the use of hook and loop fasteners. It should be appreciated the in other various exemplary embodiments, the closing flap may be hold closed by other methods common in the art, such as for example, zippers and snaps.

The case 90 is constructed out of the same material as the cover 20. The case 90 further includes a plurality of hanging flags 94 and 95. The hanging flaps 94 and 95 are disposed on an exterior of the ease 90. The hanging flaps 94 and 95 each have two ends. The first end is fixedly attached to the exterior of the case 90. The second end is removably attached to the exterior of the ease 90. The user removes the second end, wraps the second end around a piece of the structure of the tree stand 14 and then reattaches the second end to the case 90. In the present embodiment, the second end attaches to the ease 90 by the use of hook and loop fasteners. It should be appreciated that in other various exemplary embodiments, the second end may be attached to the case by other methods common in the art such as, but not limited to, snaps.

Further, the case 90, is operably configured to receive all the embodiments of the present invention presented herein.

While this invention has been described in conjunction with the specific embodiments outlined above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of this invention.

What is claimed is:

1. A device for protecting a tree stand having a frame attached to and extending from a tree comprising:

a cover having a top portion, first and second side portions, a front portion, a bottom edge defined by the first and second side portions and the front portion and a mating edge defined by the first and second side portions and the top portion, wherein the bottom edge includes a bottom edge length and a first channel along the bottom edge length, and the mating edge has a mating edge length having first, second and third sections, wherein the first and third sections are substantially parallel to the tree when the device is in use, and the second section having a second channel is disposed between the first and third sections and is substantially perpendicular to the first and third sections, wherein the cover being disposed over the frame of the tree stand, the bottom edge being disposed under the frame of the tree stand and the mating edge being adjacent to the tree when the device is in use;

a first securing member having a length and connectable ends wherein a portion of the first securing member is disposed within the first channel and the connectable ends are disposed around the tree and connect together when the device is in use, and wherein the first securing member is tightenable around the tree to tighten the bottom edge of the cover under the frame;

a second securing member having a length and connectable ends wherein a portion of the second securing member is disposed within the second channel and the connectable ends are disposed around the tree and connect together when the device is in use; and, a connecting member, wherein the connecting member has a first end that engages the first securing member and a second end that engages the second securing member.

2. The device, as recited in claim 1, wherein the cover is breathable and waterproof.

3. The device, as recited in claim 1, wherein the connecting member is slideably attached to the first and second securing members.

4. The device, as recited in claim 1, wherein the connecting member is slideably attached to the first securing member.

5. The device, as recited in claim 1, wherein the first and second securing members are adjustable in length.

6. The device, as recited in claim 1, further comprising a plurality of eyelets along the cover, wherein a third securing member is affixed to one of the plurality of eyelets such that when the device is in use, the third securing member is drawn beneath the hunting tree stand and attached to a second of the plurality of eyelets.

7. The device, as recited in claim 1, further comprising a second connecting member, wherein the first connecting member is integral to the first section of the mating edge and the second connecting member is integral to the third section of the mating edge.

8. The device, as recited in claim 1, wherein the first and second securing members are nylon web straps.

9. The device, as recited in claim 1, wherein the first securing member further includes three sections, wherein the first and third sections are nylon straps and include a male connector on the first section and a female connector on the third section, and the second section is an elastic material and is disposed between the first and third sections.

10. The device, as recited in claim 1, wherein the second section of the mating edge has a concave shape.

11. The device, as recited in claim 1, wherein the second channel is disposed on the second section of the mating edge and extended along the length of the second section.

12. The device, as recited in claim 1, wherein the connectable ends of the first securing member connect together on a first side of the tree and the connectable ends of the second securing member connect together on a second side of the tree.

13. A cover for a hunting tree stand having a frame attached to and extending from a tree comprising:

a cover member having a top portion, first and second side portions, a front portion, a first edge being defined by the first and second side portions and the front portion and having a length and a first channel throughout the length of the first edge, wherein the first edge is generally oriented parallel to the ground, and a second edge being defined by the first and second side portions and the top portion and having a first, second and third sections, wherein the first and third sections are generally oriented parallel to the tree, and the second section is concave, includes a second channel and is perpendicular to and disposed between the first and third sections wherein the cover member being disposed over the frame of the hunting tree stand, the first edge being disposed under the frame of the hunting tree stand and the second edge being adjacent to the tree when the device is in use;

a first securing member having a length divided into three sections with the first and third sections each having connectable ends, and the second section being disposed within the first channel and being elastic, wherein the connectable ends are disposed outside the first channel and the two connectable ends are operably configured to wrap around the tree and connect together when the device is in use, and wherein the first securing member is tightenable around the tree to tighten the first edge of the cover member under the frame;

a second securing member having two connectable ends, wherein a portion of the second securing member being disposed within the second channel, wherein each connectable end is outside the second channel and the two connectable ends are operably configured to wrap around the tree and connect together on a side of the tree generally opposite the connectable ends of the first securing member when the device is in use; and, a first and second tension member, wherein the first tension member is attached to the first and second securing members and the second tension member is attached to the first and second securing members.

14. The cover for a hunting tree stand, as recited in claim 13, wherein the first and second tension members are integral to the cover member.

15. The cover for a hunting tree stand, as recited in claim 13, wherein the first and second tension members are slideably attached to the first and second securing members.

16. The cover for a hunting tree stand, as recited in claim 13, further comprising a plurality of eyelets along the first edge the cover member and a third securing member affixed to one of the plurality of eyelets, such that when the device is in use, the third securing member is drawn beneath the hunting tree stand and attached to a second of the plurality of eyelets.

17. The cover for a hunting tree stand, as recited in claim 13, wherein the first and second securing members are adjustable in length.

18. The cover for a hunting tree strand, as recited in claim 13, wherein the first tension member is disposed in proximity to the first section of the second edge and the second tension member is disposed in proximity to the third section of the second edge.

* * * * *